United States Patent
Majumdar (10) Patent No.: US 7,496,926 B2
(45) Date of Patent: Feb. 24, 2009

(54) METHOD AND APPARATUS TO ENCAPSULATE A QUEUE IN A NAMESPACE

(75) Inventor: Arunava Majumdar, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 747 days.

(21) Appl. No.: 11/192,899

(22) Filed: Jul. 29, 2005

(65) Prior Publication Data

US 2007/0027928 A1   Feb. 1, 2007

(51) Int. Cl.
  *G06F 9/46* (2006.01)
  *G06F 15/16* (2006.01)
(52) U.S. Cl. ............................ 719/315; 709/245
(58) Field of Classification Search ......... 719/315; 709/245
   See application file for complete search history.

(56) References Cited

U.S. PATENT DOCUMENTS

| | | | |
|---|---|---|---|
| 5,893,116 A | 4/1999 | Simmonds et al. | 707/201 |
| 6,604,148 B1* | 8/2003 | Dennison | 709/245 |
| 6,687,701 B2 | 2/2004 | Karamanolis et al. | 707/10 |
| 2003/0033441 A1 | 2/2003 | Forin et al. | 709/315 |
| 2006/0031572 A1* | 2/2006 | Feuerstein et al. | 709/238 |

OTHER PUBLICATIONS

Lugeon et al., "A Light Weight Name Service and its use within a Collaborative Editor", Information Systems Development for Decentralized Organizations, Esprit Basic Research Project 6360, 1995, pp. 67-83.
Nuckolls, "Re: What's the best of way of renaming QMGR and Queues", mqseries, http://www.mail-archive.com/mqseries@akh-wien.ac.at/msg13016.html, Jan. 15, 2004, pp. 1-4.
"Accessing WebSphere MQ objects using COM or URL addresses", WebSphere MQ Using the Component Object Model Interface, http://middleware.its.state.nc.us/middleware/Documentation/en_US/htm/a.../amqtan0213.ht, 2002, pp. 1-3.
Halloway, "Class Loaders as a Namespace Mechanism", developers.sun.com, JDC Tech Tips, Oct. 31, 2000, 5 pages.

* cited by examiner

*Primary Examiner*—Larry D Donaghue
(74) *Attorney, Agent, or Firm*—Duke W. Yee; Martin McKinley; Houda T. El-Jarrah (57) ABSTRACT

The present invention provides a method, apparatus, and computer usable code for constructing a queue namespace object having encapsulation of data stored in the queue namespace object. A series of steps may include receiving a request from a requesting program or other entity for a queue in a set of queues using a selected name. Upon getting the request, a processor may associate a selected name with a queue namespace object in a set of namespace objects. Further features may include processing requests for accessing the queues using the selected name and the queue namespace object in the set of namespace objects such that different applications may be assigned different queues in the set of queues, even though the selected name may be the same.

3 Claims, 12 Drawing Sheets

METHOD AND APPARATUS TO ENCAPSULATE A QUEUE IN A NAMESPACE

BACKGROUND OF THE INVENTION

1. Field of the Invention

The present invention generally relates to queue management, and more specifically, to permitting two or more programs to use identically named queues in encapsulated or otherwise partitioned namespaces free of conflicts.

2. Description of the Related Art

The term "messaging" most often refers to electronic mail systems. Message-oriented middleware, however, differs from mail systems. Message-oriented middleware is high-speed, generally connectionless, and usually deployed for concurrently executing applications with a non-blocking sender. Message-queuing middleware is a type of message-oriented middleware that combines a high-speed message mover and a queuing service or message storage.

One form of message-queuing middleware is the IBM® Queue Manager, by International Business Machines Corporation, or simply IBM Queue Manager. Current versions of IBM Queue Manager provide for security, message groups, and message segmentation. IBM Queue Manager provides queuing services to application programs. A message is simply a collection of data sent by one program and intended for another program. The message consists of control information and application specific data. A queue is a named message repository where messages accumulate until they are retrieved by programs that service those queues. Applications access queues via the services provided by a queue manager. Applications can open a queue, put messages on the queue, get messages from the queue, and close the queue. A queue manager may set and inquire about the attributes of queues. Many other types of queue managers from other leading software makers provide similar features.

BRIEF SUMMARY OF THE INVENTION

The present invention provides a method, apparatus, and computer usable code to manage a set of queues. A request is received from a requester for a queue in the set of queues using a selected name. The selected name is associated with a queue namespace object in a set of queue namespace objects in response to receiving the request. Requests for accessing the queues are processed using the selected name and the queue namespace object in the set of namespace objects such that different applications may be assigned different queues in the set of queues using the selected name.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
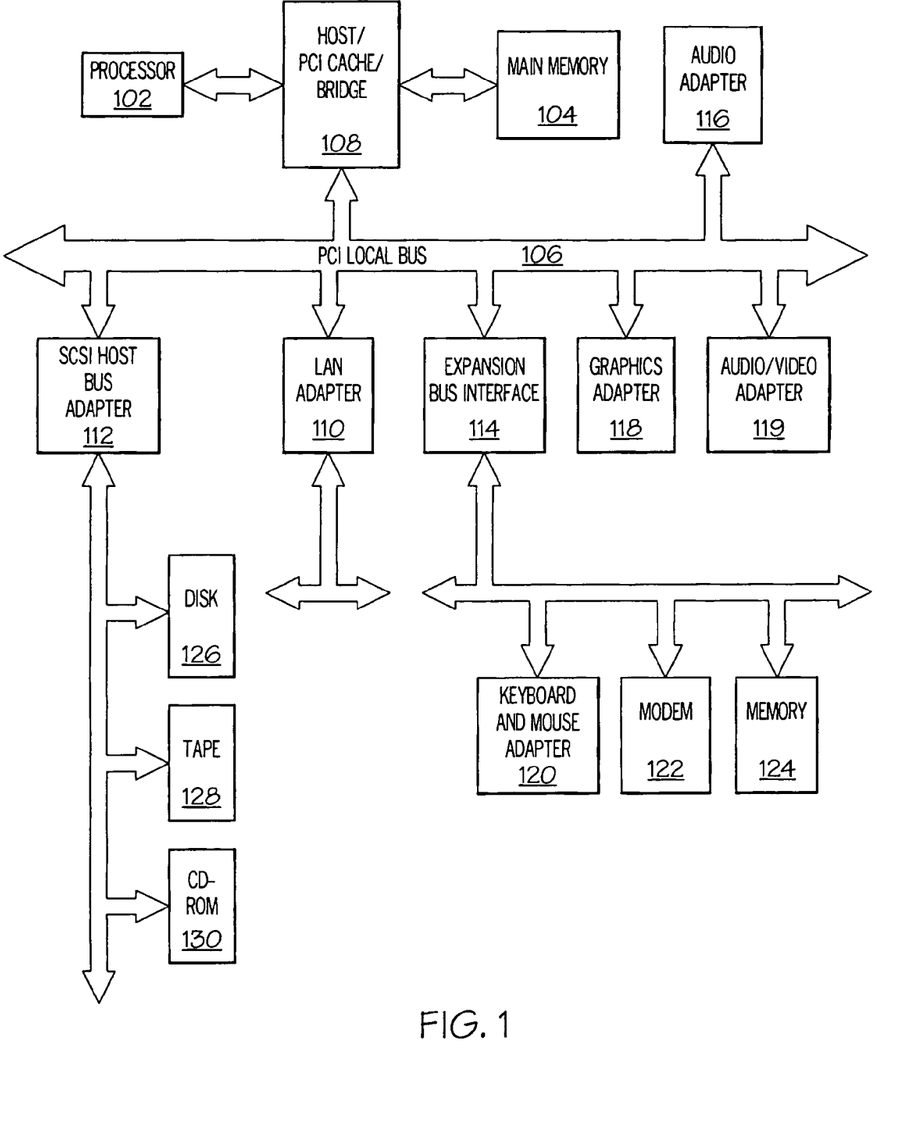
FIG. 1 is a computer system in accordance with an illustrative embodiment of the present invention.

With reference now to FIG. 1, a block diagram of a data processing system is shown in which embodiments of the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, and small computer system interface SCSI host bus adapter are connected to PCI local bus 106 by direct component connection. In contrast, audio adapter 116, graphics adapter 118, and audio/video adapter 119 are connected to PCI local bus 106 by add-in boards inserted into expansion slots.

Expansion bus interface 114 provides a connection for keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft™ Corporation.

Figure 2:
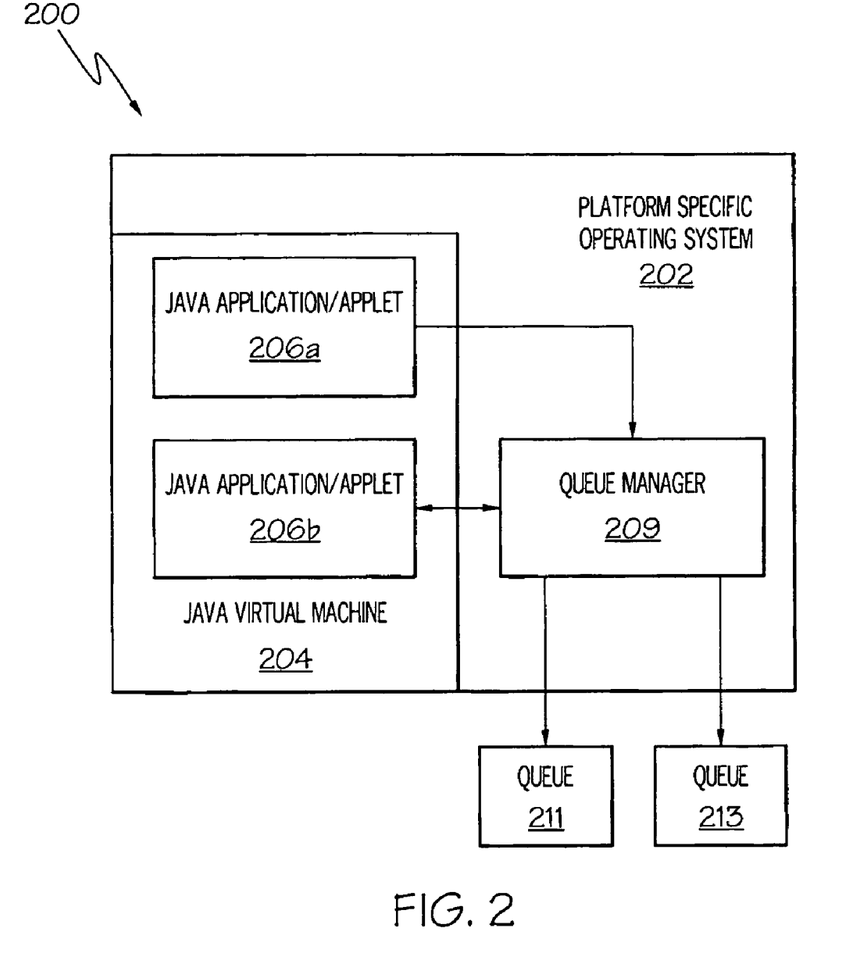
FIG. 2 is a block diagram illustrating the relationship of software components operating within a computer system in accordance with an illustrative embodiment of the present invention.

With reference now to FIG. 2, a block diagram illustrates the relationship of software components operating within a computer system that may implement the present invention. Java-based system 200 contains platform specific operating system 202 that provides hardware and system support to software executing on a specific hardware platform. Java Virtual Machine (JVM) 204 is one software application that may execute in conjunction with the operating system. Java virtual machine 204 provides a Java run-time environment with the ability to execute Java applications or applets 206*a* and 206*b*, which may be programs, servlets, or software components written in the Java programming language. The computer system in which Java virtual machine 204 operates may be similar to data processing system 100 in FIG. 1. However, Java virtual machine 204 may be implemented in dedicated hardware on a so-called Java chip, Java-on-silicon, or Java processor with an embedded picoJava core.

Queue manager 209 receives parameters in a request by either application 206*a* or application 206*b* in this illustrative example. Queue manager 209 provides an interface by which applications may indirectly create, modify or delete queues by sending requests to queue manager 209. Queue manager 209 may more directly control the creation, modification or deletion of a set of queues. These actions are ones used to manage the set of queues. In these examples, the set of queues may include queue 211 and queue 213.

At the center of a Java run-time environment is the Java virtual machine which supports all aspects of Java's environment, including its architecture, security features, mobility across networks, and platform independence.

The present invention provides a method, apparatus, and computer usable code for managing queues. When a request is received from a requestor for a queue in the set of queues using a selected name, the selected name is associated with a queue namespace object in a set of queue name space objects. A queue namespace object has the properties of a namespace object wherein each queue namespace object has allocated storage for a queue or a reference to an undefined queue. The queue namespace object may contain or reference one or more other queue namespace objects. A namespace is space reserved by a file system or other data structure to contain the names of objects associated with the file system or other data structure. Within a given namespace all names are unique, although the same name may be used with a different meaning in a different namespace. A namespace object is an object that contains methods for creating and resolving names at a namespace or a particular level of scope. A namespace object may have methods for other activities relating to names.

Requests for accessing the queues are processed using the name and the queue namespace object in the set of queue namespace objects such that different applications may be assigned different queues in the set of queues using the same name. In this manner, the illustrative embodiments of the present invention may permit use of common queue names without the additional processing overhead of having a second queue manager in operation and with naming of queues being practiced in the background.

The Java virtual machine is the name of a virtual computer component that actually executes Java programs. Java programs are not run directly by the central processor but instead by the Java virtual machine, which is itself a piece of software running on the processor. The Java virtual machine allows Java programs to be executed on a different platform as opposed to only the one platform for which the code was compiled. Java programs are compiled for the Java virtual machine. In this manner, Java is able to support applications for many types of data processing systems which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine-independent code generated by the Java compiler and executed by a Java interpreter. A Java interpreter is part of the Java virtual machine that alternately decodes and interprets a bytecode or bytecodes. These bytecode instructions are designed to be easy to interpret on any computer and easily translated on the fly into native machine code. Byte codes may be translated into native code by a just-in-time compiler or JIT.

Java applications or applets 206*a* and 206*b* are examples of applications that may use a queue system of the present invention. The presence of multiple Java applications or applets being tested is one example of a situation in which the queue system of the present invention is particularly useful.

Figure 3:
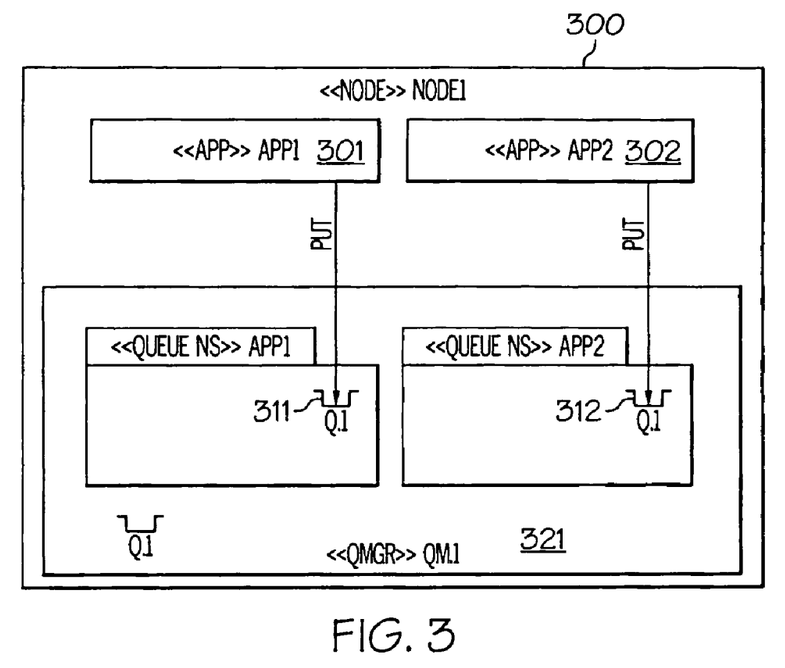
FIG. 3 is a partitioned queue namespace in accordance with an illustrative embodiment of the present invention.

FIG. 3 is a message queue notation diagram in accordance with an illustrative embodiment of the present invention. In this illustrative example, the diagram relates to WebSphere® using the conventions of "Using UML in WebSphere Business Integration Message Broker Solution Architecture", ©2005, International Business Machines Corporation. FIG. 3 illustrates queue names in several queue namespaces such that each queue name is encapsulated on the basis of distinct applications. Of course the processes, apparatus, and computer usable code of the present invention may be implemented using other message queue systems. A queue namespace is a namespace that provides a data structure in which either a queue object may be referenced or a queue namespace object may be referenced. Multiple queue objects and multiple queue namespace objects may be contained in a queue namespace.

A node may be a machine or a logical partition. In this case, the node is named node1 300. Node1 300 has two applications that run concurrently, APP1 301 and APP2 302. APP1 301 may invoke a Java method embodiment of the invention to resolve a queue namespace for using a queue having the name "Q.1". The queue, Q.1 311, may exist within a queue namespace APP1/Q.1". A namespace is a context where a name uniquely identifies a variable or objects so there is no ambiguity when variables or objects from different sources are used together. A queue namespace is a namespace wherein each object that is constructed and has allocated storage includes a queue or a reference to an undefined queue.

A Java method embodiment of the invention may be a feature or method of an advanced queue manager, QM.1 321. It is appreciated that an embodiment of the invention may be implemented in many programming environments other than Java, using compiled or interpreted code. Likewise, APP2 302 may invoke a QM.1 321 embodiment of the invention to resolve a queue namespace, such that Q.1 312 is encapsulated and distinct from Q.1 311.

A queue namespace schema map is the mapping of a queue namespace to a mapping attribute. A queue namespace schema map may provide an automatic mapping between the mapping attribute and the queue namespace. A mapping attribute is a string that may operate to define a hierarchical level of a queue namespace tree. The string may be an option, which might be available from the environment of an application. An example of an option is a user identifier. The string may be an ad hoc mapping attribute, which may be selected arbitrarily by a user of an application. Thus, as an example of a mapping attribute, the mapping attribute, user identifier, may be mapped to a user identifier namespace inside, for example, a queue namespace of the application name. It may be convenient to encapsulate one namespace within another on the basis of a user's login identifier so that two users use distinct queues.

The presence of a user identifier hierarchical level among the levels of the queue namespace is one example of a pre-defined mapping rule. Each pre-defined mapping rule may have a corresponding mapping attribute flag. The mapping attribute flag may be a Boolean switch that may be set according to a user preference. That is, the mapping attribute flag may be turned on or off based on a user preference. At various stages in queue namespace resolution, a check may be made to see if the flag for an option is set.

A queue namespace schema map may exist without a set of mapping rules for automatic schema mapping. This kind of queue namespace schema map is referred to as an ad hoc queue namespace schema map and is a kind of queue namespace schema map. A queue namespace schema map that is associated with automatic mapping is also a kind of queue namespace schema map. There is no automatic mapping in the case of an ad hoc queue namespace schema map.

The distinction between an administrative queue and a dynamic queue is that the dynamic queue is, in general, a simpler kind of queue. A dynamic queue may sacrifice the ability to keep persistent messages. Permanent queues are administratively created queues or administrative queues. The administrative queues are more commonly used for administrative convenience and use less overhead at runtime than dynamic queues. Since the names and characteristics of administrative queues are fairly constant, and only changed administratively after scrutiny, the administrative queues can be monitored.

Modifying and deleting queue namespaces may comprise the application sending a queue namespace string to a queue manager. This string also may be accompanied by one or more parameters that may change the queue that is within the queue namespace. In addition, an operation of creating a queue namespace object may comprise a sending of a queue namespace string from application to queue manager accompanied by one or more parameters that may create the queue. The parameters may include, among others, queue size, maximum size of each message, and special triggers that should occur on the basis of the time or content of a message. A user may use a graphical user interface to command a queue manager to modify and delete queues.

Several examples exist of mapping attributes available from the environment. First is a "project name", an option. A project name may be a convenient name created to administratively distinguish two or more activities that may make use of the same application, for example, "unit testing", or "integration testing", or "call processing". One way of setting the project name is to set a preprocessor directive when compiling an application. Any invocation of that particular application may store the project name in a variable obtained, by convention, by an advanced queue manager embodiment of the invention.

A second example is "application name", an option. An application name is readily obtained by an advanced queue manager embodiment of the invention simply by looking up the name of a process or application that has invoked the advanced queue manager.

A third example is "application version", an option. An application version is commonly set by using a preprocessor directive when compiling an application. Many other methods other than preprocessor directives to set an option may exist. For example, a configuration file may be established which sets values for each such option. An advanced queue manager may obtain the application name stored in the application or program.

A fourth example is "user identifier", an option. A user identifier may be obtained by advanced queue manager by determining the owner of a process, which is the user identifier.

Figure 4:
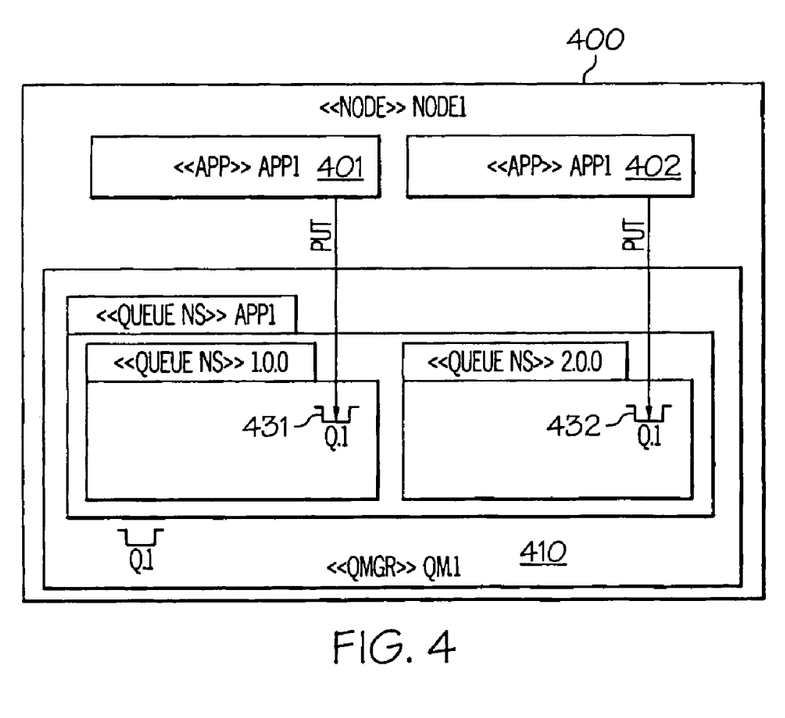
FIG. 4 is a partitioned queue namespace in accordance with an illustrative embodiment of the present invention.

FIG. 4 is a message queue notation diagram in accordance with an illustrative embodiment of the present invention. FIG. 4 illustrates queue names in several queue namespaces such that each queue name is encapsulated on the basis of same named applications, but different version names. Node1 400 has two instances of two versions of the same application running: APP1 401 and APP1 402. Since APP1 401 may have been compiled with a preprocessor directive that sets application version to be "1.0.0", advanced queue manager, QM.1 410 may determine that two options are set: an application name option and a application version option. Accordingly, QM.1 410 may reference a queue namespace that nests a queue namespace "1.0.0" within a queue namespace "APP1", providing an encapsulated queue, Q.1 431 that may be referenced as APP1/1.0.0/Q.1. Similarly, QM.1 410 may resolve or create a queue namespace that nests a queue namespace "2.0.0" within a queue namespace "APP1". Thus, QM.1 410 may provide an encapsulated queue, Q.1 432 that may be referenced as APP1/2.0.0/Q.1, upon invocation by APP1 402. A user who starts APP1 401, and a user who starts APP1 402, may not need to concern themselves with the intricacies of setting up independent and encapsulated namespaces, since the resolution of Q.1 431 and Q.1 432 may occur transparently through automatic mapping.

Figure 5:
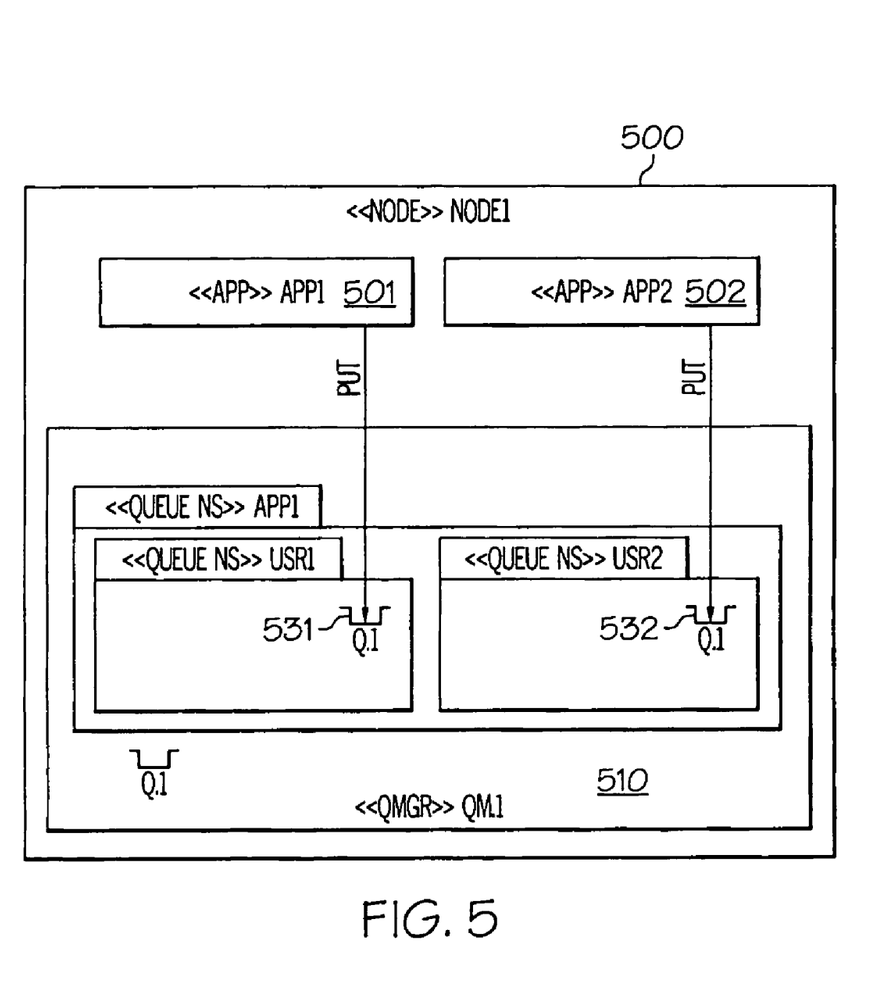
FIG. 5 is a partitioned queue namespace in accordance with an illustrative embodiment of the present invention.

FIG. 5 is a message queue notation diagram in accordance with an illustrative embodiment of the present invention. FIG. 5 illustrates queue names in several queue namespaces such that each queue name is encapsulated on the basis of distinct user identifiers. Node1 500 has two instances of two versions of the same application running: APP1 501 and APP1 502. QM.1 510 may determine that two options are set: an application name option and a user identifier option. Accordingly, QM.1 510 may resolve or create a queue namespace that nests a queue namespace "USR1" within a queue namespace "APP1", provided that an owner of the application, APP1 501, is usr1. The user names that may operate the two instances of APP1 may be "USR1" and "USR2" respectively. In addition, QM.1 510 may resolve or create a queue namespace that nests a queue namespace "USR1" within a queue namespace "APP1", provided that an owner of the application, APP1 502, is USR2. Thus, an application owned by USR2 may use the queue name Q.1 532 in an independent manner from a queue name Q.1 531 referenced with application, APP1 501, owned by USR1. Q.1 531 may be referenced as APP1/USR1/Q.1 and Q.1 532 may be referenced as APP1/USR2/Q.1.

Figure 6:
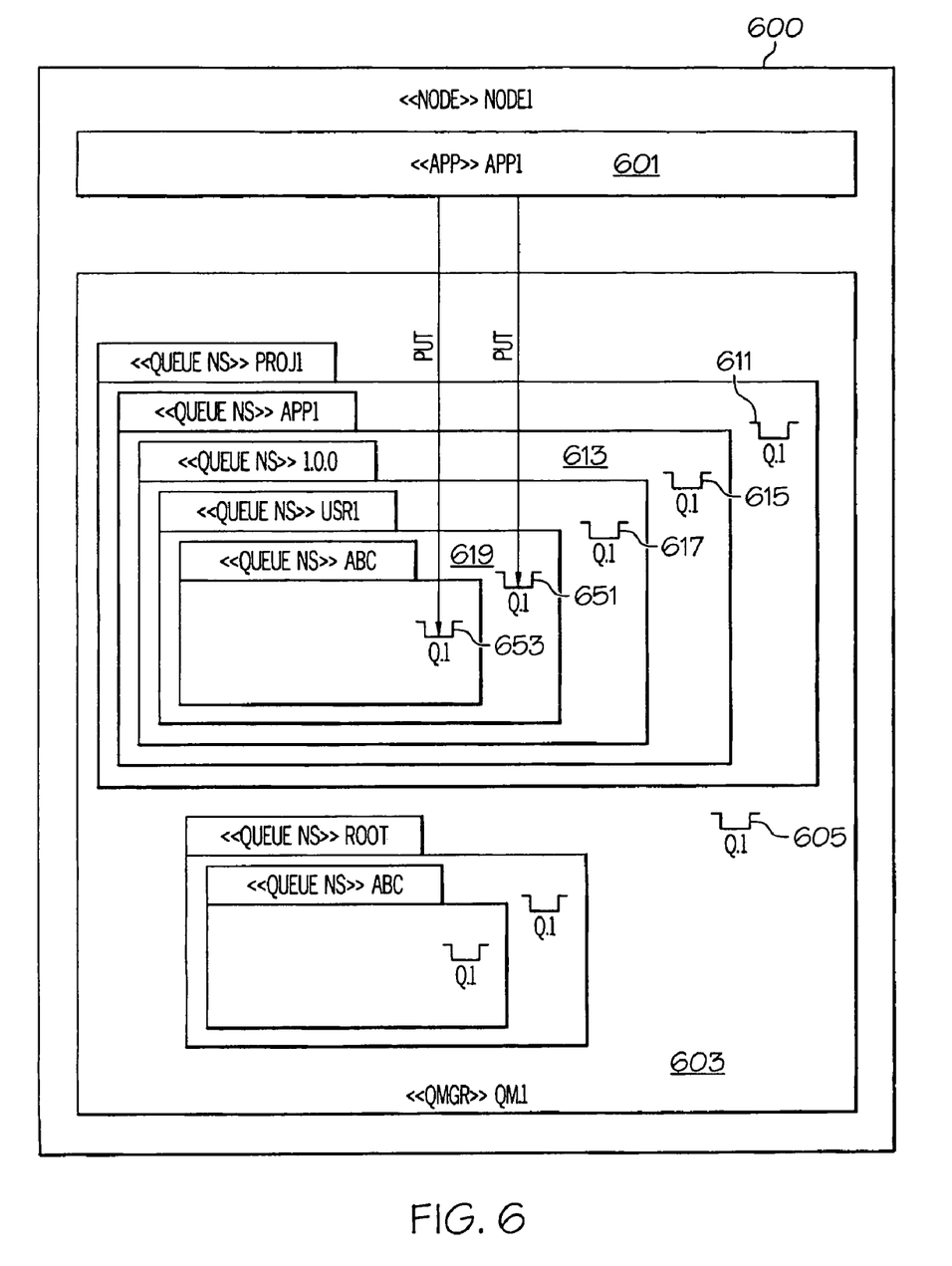
FIG. 6 is a partitioned queue namespace in accordance with an illustrative embodiment of the present invention.

FIG. 6 is a message queue notation diagram in accordance with an illustrative embodiment of the present invention. FIG. 6 illustrates queue names in several queue namespaces such that each queue name is encapsulated on the basis of project name, application name, application version, user identifier, and an ad hoc queue namespace schema map. A node named NODE1 600 may support an application named APP1 601 and a queue manager named QM.1 603. Queue manager 603 may support a generically named queue named Q.1 605 which is located in the global namespace. Several tiers of hierarchy may encapsulate other queue namespaces, each having a queue using the name Q.1. Application, APP1 601, may be able to put one or more messages into nested queue 651 or to an even more nested queue 653, once APP1 has invoked QM.1 603 with the options set. The set options may be project name, application name, application version, and user identifier. Within the environment of NODE1 600 queue namespaces exist that allow distinct queues named Q.1 to exist at other hierarchical levels. If a project name option is set, queue "PROJ1/Q.1" 611 may be referenced. Within the project, an application name, APP1 613 queue namespace may exist. The queue namespace may contain queue "PROJ1/APP1/Q.1" 615. Within App1 613, an application version option may be set. Thus, queue namespace "PROJ1/APP1/1.0.0/Q.1" 617 may exist. Such a queue namespace may contain a user, USR1 619, and USR1 may contain "PROJ1/APP1/1.0.0/usr1/Q.1" queue 651. Q.1 653 is special in that it introduces another class of queue namespace schema map—the ad hoc queue namespace schema map. The ad hoc queue namespace schema map is distinct from the option queue namespace schema map in that the ad hoc queue namespace schema map is not established by looking up the ad hoc queue namespace schema map from the environment.

Figure 7:
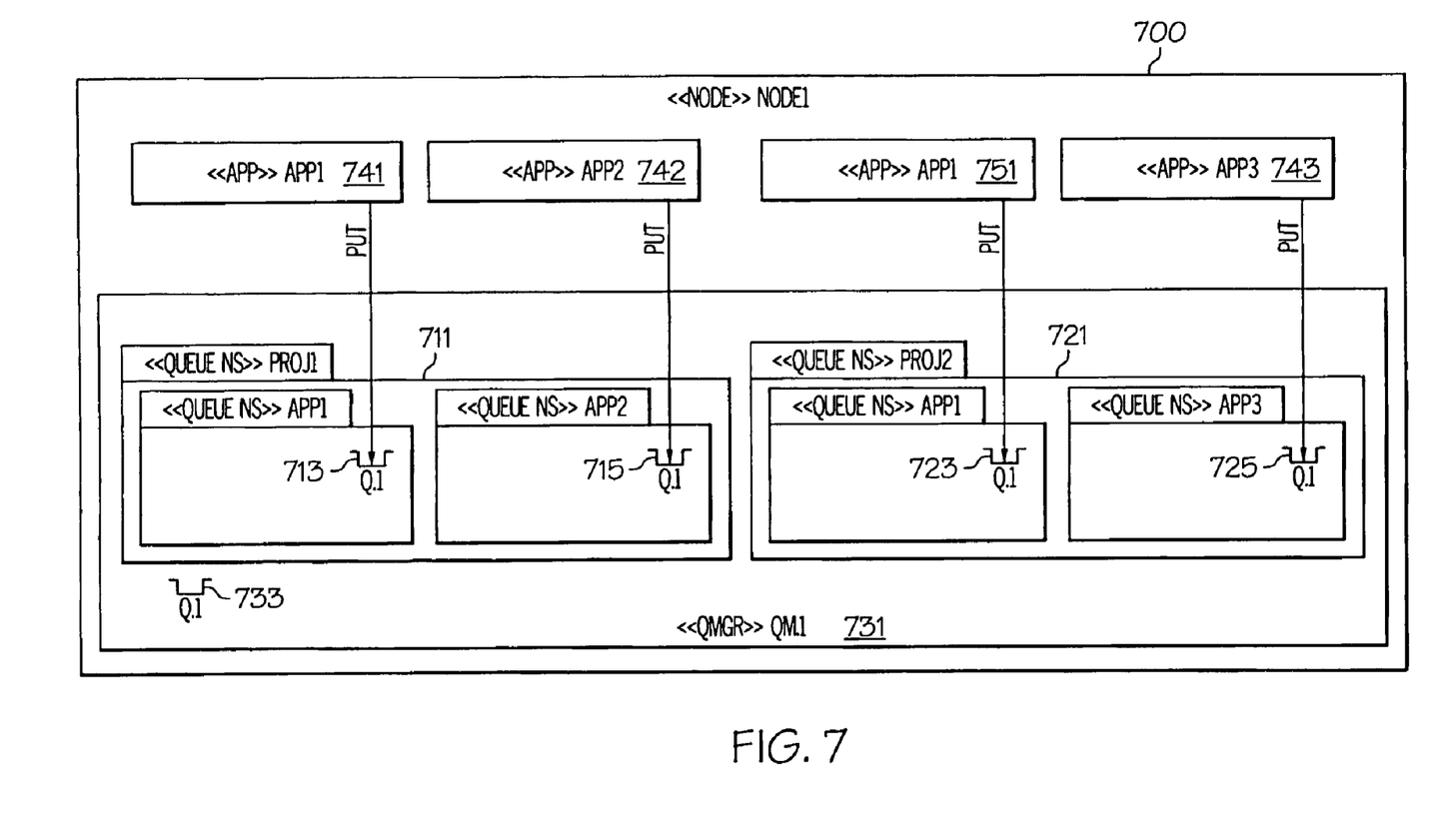
FIG. 7 is a partitioned queue namespace in accordance with an illustrative embodiment of the present invention.

Another example of queue namespaces in use is shown in FIG. 7. FIG. 7 illustrates queue names in several queue namespaces such that each queue name is encapsulated on the basis of distinct project names and distinct application names. In FIG. 7, options for application name and project name are set. Under the scenario shown, the steps to find queue namespaces are executed in FIGS. 10A-10C as described below. Processing executes on node 700. A first project, PROJ1 711, provides a junction in which two queue namespaces may reside: PROJ1/APP1/Q.1 713 and PROJ1/APP2/Q.1 715. The second project, PROJ2 721, provides a junction in which two queue namespaces may reside: PROJ2/APP1/Q.1 723 and PROJ2/APP3/Q.1 725. In addition, queue manager 731 still supports a more conventional queue object "Q.1" 733 now considered to be in the global queue namespace.

Queue namespace objects, PROJ1/APP1/Q.1 813 and PROJ1/APP2/Q.1 715 are accessed by application instance, APP1 741 and APP2 742, respectively. Queue namespace objects, PROJ2/APP1/Q.1 723, and PROJ2/APP3/Q.1 725 are accessed by application instance, APP1 751 and APP3 743, respectively.

The illustrative examples permit several kinds of queue namespace schema maps to define, in whole or in part, a hierarchical level. A hierarchical level may correspond to an application name, for example, "APP1". A hierarchical level may correspond to a user identifier, for example, "USR1". A hierarchical level may correspond to a project name, for example, "PROJ1". These examples are provided for purposes of illustrating the different aspects of the present invention and are not meant as architectural limitations or limitations as to the types of options that may be used.

Figure 8A:
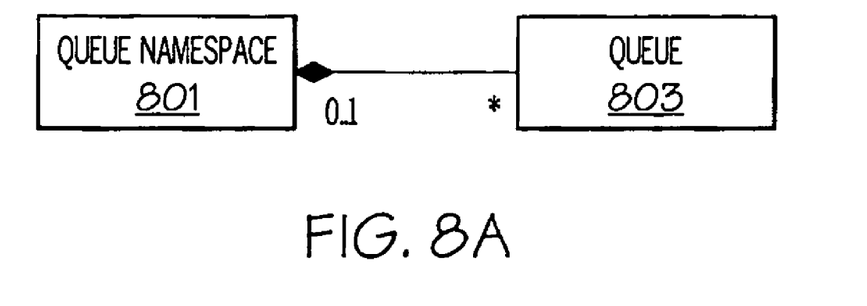
FIG. 8A is specific unified modeling language diagram of a queue namespace object in accordance with an illustrative embodiment of the present invention.

With reference now to FIG. 8A, a unified modeling language (UML) diagram is shown of the chief objects in use in an embodiment of the invention. Queue namespace object 801 may be instantiated or constructed by an advanced queue manager embodiment such that zero or more queue objects 803 are part of a new queue namespace. A queue namespace may be a Java object that provides for a tree structure of hierarchical levels. As shown, particularly in FIG. 6, many hierarchical levels may exist which permit a queue of the identical name to exist within each level and still be distinct when created and accessed by the advanced queue manager. It is appreciated that other programming environments besides Java may create objects having the property of a queue namespace.

Figure 8B:
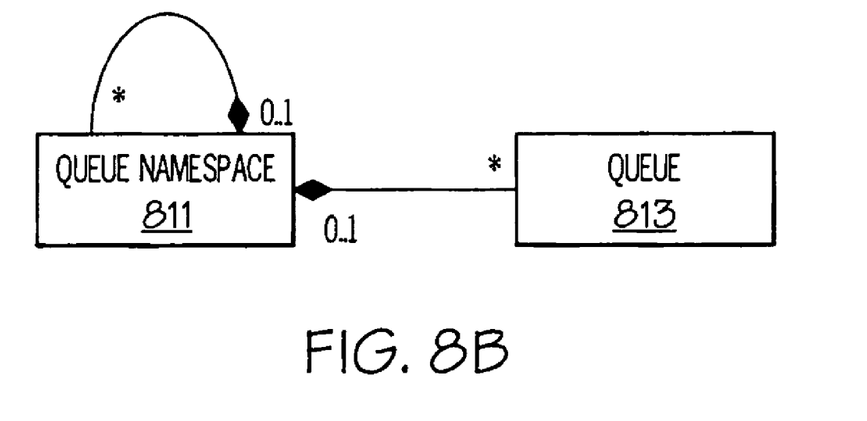
FIG. 8B is generalized unified modeling language diagram of a queue namespace object in accordance with an illustrative embodiment of the present invention.

With reference now to FIG. 8B, a unified modeling language (UML) diagram is shown of the chief objects in use in an embodiment of the invention. One or more illustrative embodiments of the invention may create and search through aspects of the objects depicted in FIGS. 8A and 8B. A queue namespace instance may have one or more instances of queue 813 within queue namespace 811. In addition, an instance of queue namespace 811 may have, as child tree nodes, additional instances of queue namespace 811. Thus, the queue namespace has a queue namespace as a property of itself. Like the queue object 813, the queue namespace component of a 'parent queue namespace' takes the name of the parent queue namespace and appends the name of the 'child queue namespace' to that of the parent. When a queue namespace has another queue namespace as a component, the other queue namespace is nested within the queue namespace. This other queue namespace also is referred to as a child queue. In the hierarchy just shown, there may be multiple levels of nesting queue namespaces. The parent queue namespace is at a higher level than the child queue namespace in these examples. Conversely, the child queue namespace is said to be at a lower level than the parent queue namespace. As may be appreciated, a queue namespace object may become a tree when there are multiple queue namespace objects nested within the higher level queue namespace object. As such, each queue namespace object may be described as a tree-node in a tree. Siblings to that tree-node may be described as at the same hierarchical level.

Figure 8C:
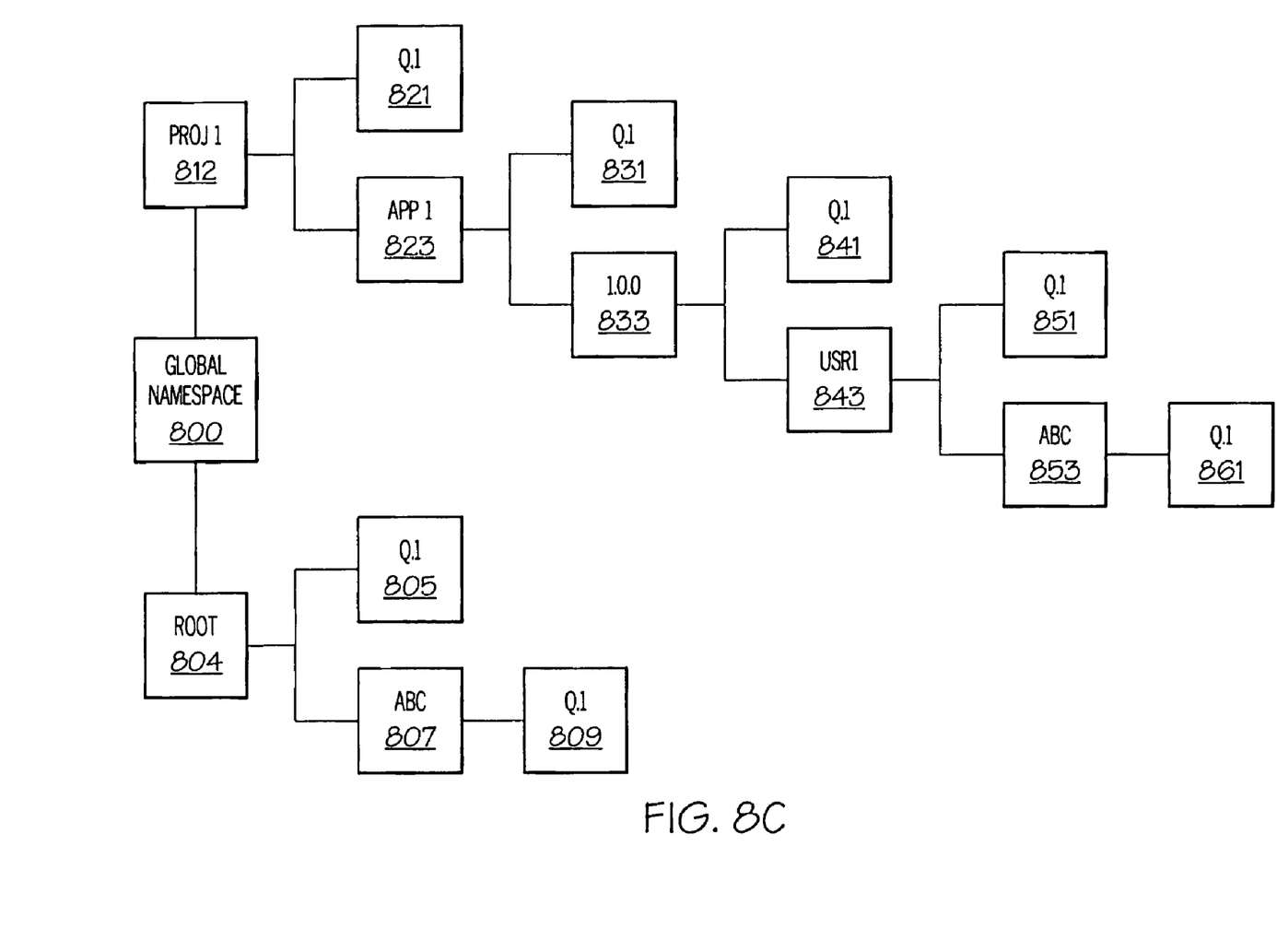
FIG. 8C is a depiction in tree-form of the partitioned queue namespace of FIG. 6.

FIG. 8C shows how a tree structure may be represented, particularly the nested views shown in FIG. 6. Global namespace 800 of the advanced queue manager may serve as an underlying or root-style tree node. PROJ1 812 and root 804 may each be queue namespaces one hierarchical level below global namespace 800. Q.1 821 and APP1 823 may be child queue and child queue namespaces of PROJ1 812 respectively.

Q.1 831 and 1.0.0 833 may be child queue and child queue namespaces of App1 823 respectively. Q.1 841 and usr1 843 may be child queue and child queue namespaces of 1.0.0 833 respectively. Q.1 851 and abc 853 may be child queue and child queue namespaces of usr1 843 respectively. Q.1 861 may be a child queue of abc 853. The relations between abc 853 and Q.1 861 are that abc represents a option queue namespace schema map, while Q.1 represents an attribute that is the last remaining attribute for the queue namespace, PROJ1/APP1/1.0.0/USR1/ABC/Q.1.

Q.1 805 and abc 807 may be child queue and child queue namespaces of root 804 respectively. Q.1 809 may be a child queue of abc 807.

One advanced queue manager embodiment may be, for example, a processor executing instructions. Once a queue object is instantiated within a queue namespace, the processor concatenates the name of the queue namespace to the queue's name. The feature is an aspect of encapsulation for objects and hides data and method implementation details behind an abstract interface. Encapsulation may be useful in that a queue manager may support simultaneously multiple queues having the name, for example, "Q.1". As an example, processes under the control of a first user having a login identifier, "usr1" may obtain a queue having the name "Q.1" but stored in a queue namespace object named, "/QUEUES/APP/USR1/Q.1". At the same time, a second user having a login identifier, "USR2" may obtain a queue having the name "Q.1" but stored in a queue namespace object named, "/QUEUES/APP/USR2/Q.1".

Figure 9:
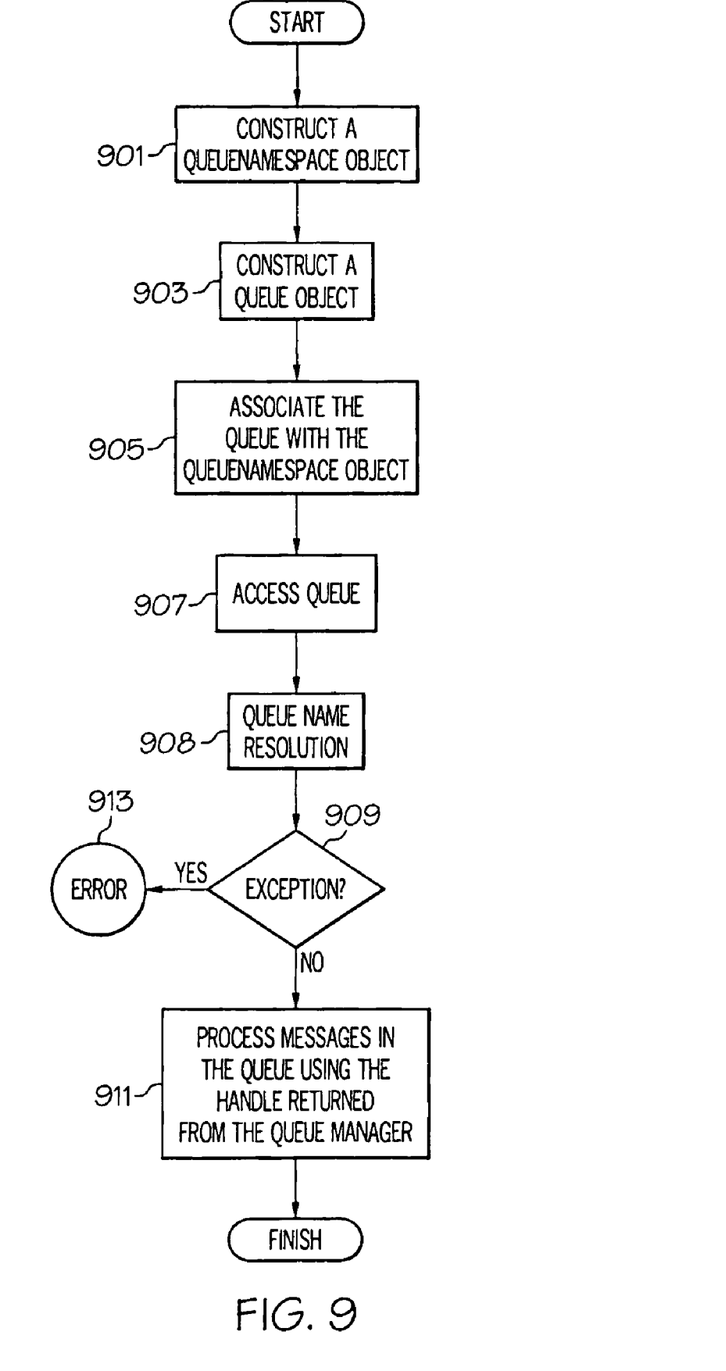
FIG. 9 is a flowchart of steps to construct a queue namespace of FIG. 8B in accordance with an illustrative embodiment of the present invention.

Resolution of the objects shown in FIG. 8A and FIG. 8B is depicted in the flowchart in FIG. 9. The flowchart shows the application trying to access a queue in a queue namespace that may or may not be nested. The application may also access a queue outside any namespaces in the more traditional way from the global namespace. FIG. 9 illustrates an example where the queue to be searched is associated with a single namespace. The steps of FIG. 9 may be performed by an application that requests a queue name to be resolved by one advanced queue manager embodiment. The application that makes the request is a requester. The requester application may be a Java object, for example, but may be implemented in other languages as well. The requestor application may operate as a thread on Java virtual machine 204, for example, of FIG. 2.

A queue manager may construct a queue namespace object by placing the object into a memory, for example, a heap (step 901). Processor 102 may perform the machine language steps of constructing. Processor 102 may construct a queue object (step 903). When processor 102 constructs the queue object, processor 102 has created a particular queue. Next processor 102 may associate the queue, for example, queue 803 of FIG. 8A, with the queue namespace, for example, queue namespace 801 of FIG. 8A (step 905).

A sequence of steps may be called into action when processor 102 accesses the queue that is now associated with the queue namespace (step 907). Processor 102 may perform a queue name resolution (step 908), further described in FIGS. 10A-10C. Java virtual machine may push parameters, such as an open queue onto a stack or other convenient memory space for passing variables from an application. The Java virtual machine may be, for example, Java virtual machine 204 of FIG. 2. The queue name resolution of the queue may cause an exception which processor 102 will test for (step 909). A "yes" occurrence on the test, results in error amelioration code to be executed (step 913). Otherwise, a "no" response to the test, directs the processor to process messages in the queue using a handle returned from the steps of accessing the queue (step 911). The handle may be a convenient file pointer or address location storing the methods and data of the queue object 803 of FIG. 8A.

Figure 10A:
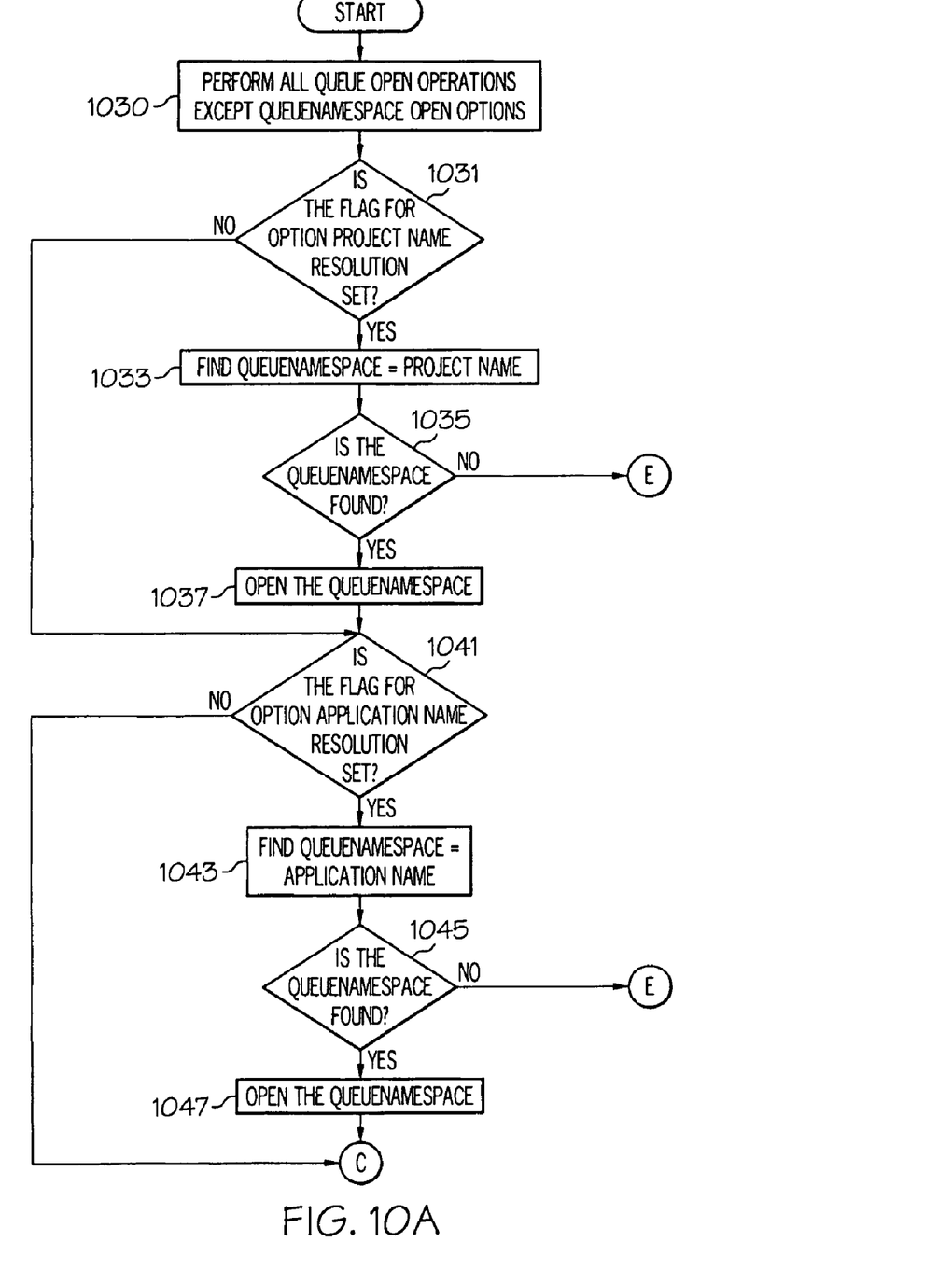
FIGS. 10A-10C are flowcharts of steps to create a queue within a queue namespace object in accordance with an illustrative embodiment of the present invention.
Figure 10B:
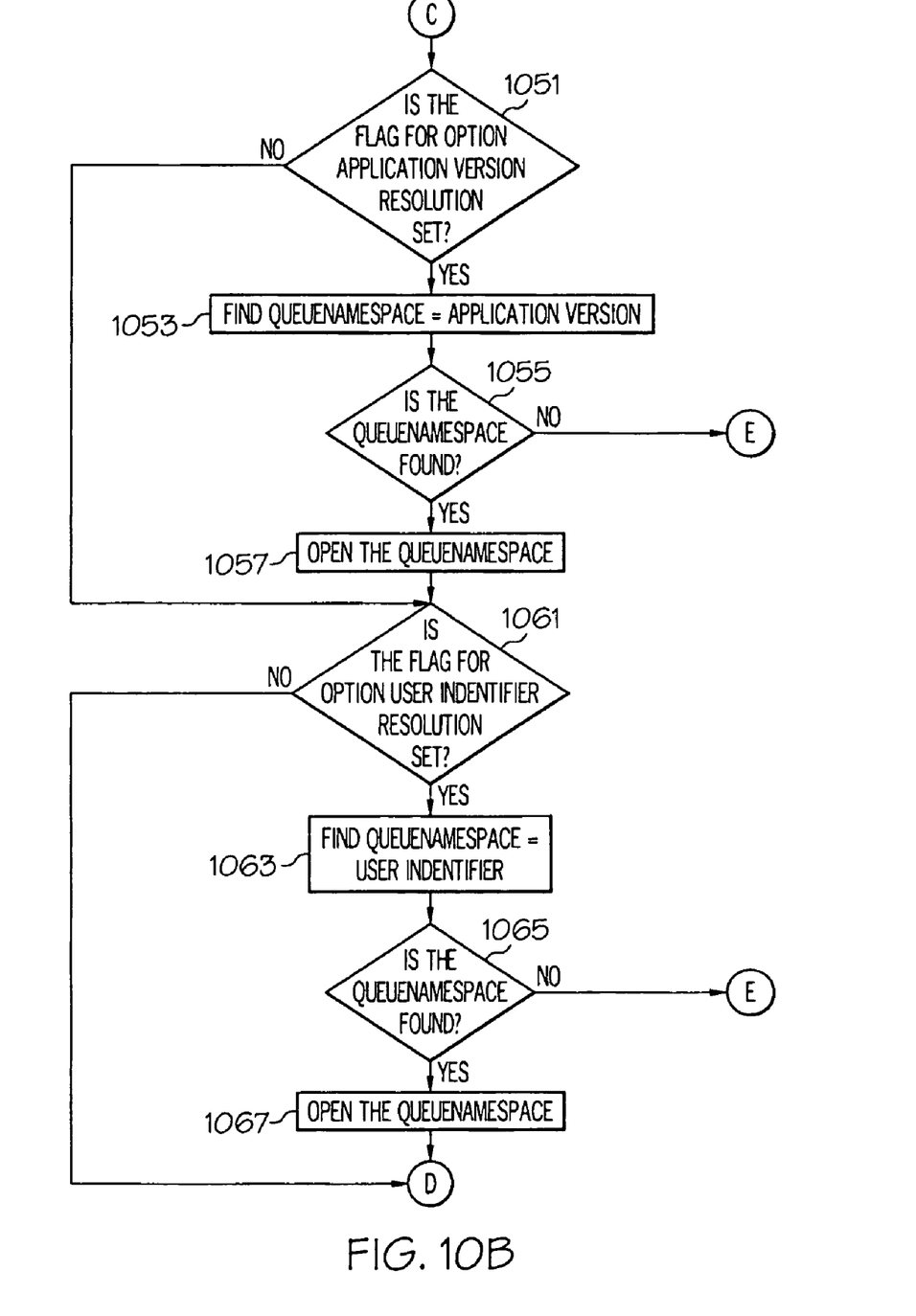
Figure 10C:
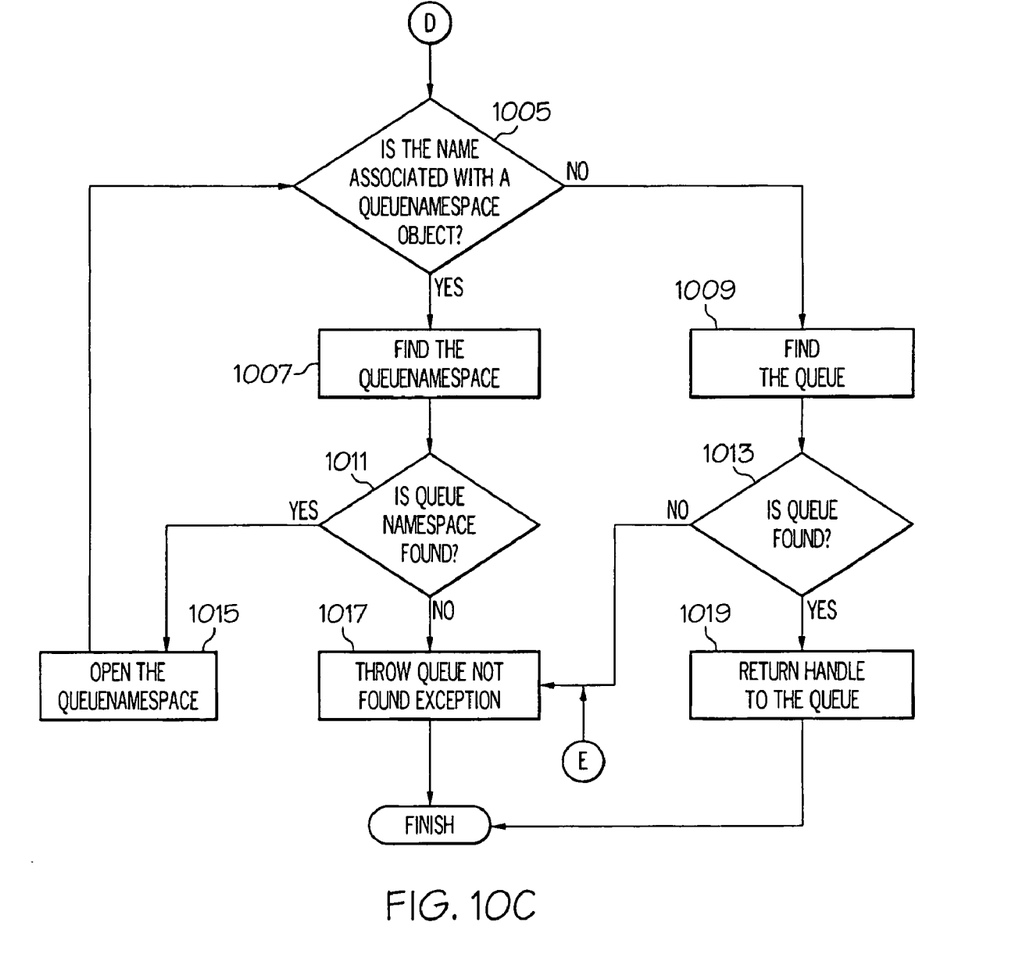

With reference now to FIGS. 10A-10C, an application level flowchart is shown that demonstrates how a queue object representation within a queue namespace is resolved by way of queue name resolution in accordance with an illustrative embodiment of the present invention and a handle to the queue is returned if the resolution is successful. Steps of FIGS. 10A-10C may be performed by an advanced queue manager embodiment or simply, queue manager. A queue manager may obtain variables passed by the requestor application. Variables may be placed on a stack. The queue manager may be, for example, queue manager 209 of FIG. 2.

Initially, processor performs all queue open operations short of opening a queue namespace (step 1030). Among the operations performed may be receiving a queue namespace object from the application that invokes the queue manager. The machine language steps of queue manager 209, such as, opening, may be performed by a processor, for example, processor 102 of FIG. 1.

Options are variables available from the environment of the calling program, such as, the user's login identifier that owns a process as may occur in Unix-type operating systems. Another example of an option is the application name that has called the embodiment into action. Processor may then ask, in series, which flag is set, for example, project name, application name, application version, and user identifier options. A user may set a binary "1" in a user interface to establish by which options to differentiate a queue namespace object. The content for each option may be selected from an environment variable, for example, the user login identifier is commonly available as an environment variable, and an embodiment of the invention may read the environment variable in conjunction with determining whether an option is set.

Next, processor 102 may determine if the flag for option "project name" is set (step 1031). If "yes", processor 102 may search through a data structure, for example, a directory file system or a database, to find a queue namespace based on the project name (step 1033). A determination may be made whether the queue namespace specified was found (step 1035). A "yes" determination may direct processor 102 to open the queue namespace using the project name (step 1037). A "no" determination of step 1035 will direct the processor to perform further processing via connector "E". A "no" determination of step 1031 directs the processor to step 1041 by skipping steps 1033, 1035 and 1037.

Processor may determine if the flag for option "application name" is set (step 1041). If "yes", processor may search through a data structure, for example, a distributed file system or a database to find a queue namespace based on the application name (step 1043). A determination may be made whether the queue namespace specified was found (step 1045). A "yes" determination may direct processor to open the queue namespace using the application name (step 1047). A "no" determination of step 1045 will direct the processor to perform further processing via connector "E". A "no" determination of step 1041 directs the processor to step 1051 by skipping steps 1043, 1045 and 1047.

The processor may determine if the flag for option "application version" is set (step 1051). If "yes", processor may search through a data structure, for example, a distributed file system or a database to find a queue namespace based on the application version (step 1053). A determination may be made whether the queue namespace specified was found (step 1055). A "yes" determination may direct processor to open the queue namespace using the application version (step 1057). A "no" determination of step 1055 will direct the processor to perform further processing via connector "E". A "no" determination of step 1051 directs the processor to step 1061 by skipping steps 1053, 1055 and 1057.

Once a queue namespace based on an application version option is opened, processor may determine if the flag for option "user identifier" is set (step 1061). If "yes", processor may search through a data structure, for example, a distributed file system or a database to find a queue namespace based on the user identifier (step 1063). A determination may be made whether the queue namespace specified was found (step 1065). A "yes" determination may direct processor to open the queue namespace using the user identifier (step 1067). A "no" determination of step 1065 will direct the processor to perform further processing via connector "E". A "no" determination of step 1061 directs the processor to step 1005 by skipping steps 1063, 1065 and 1067.

If all the mapping attribute flags are switched off, the determination of steps 1031, 1041, 1051 and 1061 results in "no" and the resolution processing passes to FIG. 10C, via connector "D". The steps of FIG. 10C may search a queue namespace for a queue namespace or for a queue. If searching for a queue, alone, the queue may be in the global queue namespace.

Briefly, for a highly-nested queue namespace such as PROJ1/APP1/1.0.0/USR1/ABC/Q.1 queue namespace, FIGS. 10A-10C would initially open PROJ1 queue namespace (step 1037), then PROJ1/APP1 queue namespace (step 1047), then PROJ1/APP1/1.0.0 queue namespace (step 1057), then PROJ1/APP1/1.0.0/USR1 queue namespace (step 1067).

Continuing with FIGS. 10A-10C, processor makes a determination of whether the name offered to a queue manager object is associated with a queue namespace object (step 1005). This determining step (step 1005) may include parsing a selected name passed by the requester application. Processor may parse the selected name to obtain a queue namespace schema map at the current hierarchical level. This determining step (step 1005) may include parsing a selected name passed by the requestor application. Processor may parse the selected name to obtain a queue namespace schema map at the current hierarchical level. The selected name may be a queue name, for example, Q.1. The queue name may be a pre-set default name. So the selected name may be the same as the pre-set default name. The selected name may be more detailed. The selected name may include a queue namespace schema map. The queue manager object may determine based on data type the current hierarchical level. The queue manager may determine whether the level is of a queue namespace or a queue. Thus, for a name, for example, "PROJ1/APP1/1.0.0/USR1/ABC/Q.1", an initial hierarchy level may be the "PROJ1/APP1/1.0.0/USR1" queue namespace. The processor determines that "PROJ1/APP1/1.0.0/USR1/ABC" is a queue namespace object and takes the "yes" branch to find the queue namespace (step 1007). The find (step 1007) may store a result for later testing, wherein the result may suggest that the string, in this case "PROJ1/APP1/1.0.0/USR1/ABC", was useful to find an instantiated queue namespace within the data structure (step 1011). If the test (step 1011) determines that the queue namespace was found to be instantiated, a "yes" branch is taken to open the queue namespace (step 1015). Otherwise, a "no" branch is taken which throws a "queue not found" exception (step 1017). Note that the exit point labeled "E" in FIGS. 10A-10B causes processing to continue at "queue not found" exception (step 1017).

One or more iterations may follow opening the queue namespace (step 1015). Opening the queue namespace may increment the hierarchical level such that, in the case "PROJ1/APP1/1.0.0/USR1/ABC/Q.1" was delivered to step 1005, the hierarchical level may become "PROJ1/APP1/1.0.0/USR1/ABC". Absent any errors, processor will take the result and test it to determine the queue namespace was instantiated or found (step 1011). The queue namespace will be opened to a further hierarchical level, which may be "PROJ1/APP1/1.0.0/USR1/ABC/Q.1".

This iteration, the answer to the question: "Is the name associated with a queue namespace object?" is "no", and processor determines whether a queue is found (step 1009). The find (step 1009) may store a result for later testing, wherein the result may suggest that the string, in this case "PROJ1/APP1/1.0.0/USR1/ABC/Q.1", was useful to find an instantiated queue within the data structure (step 1013). If the test (step 1013) determines that the queue namespace was found to be instantiated, a "yes" branch is taken to return a handle to the queue (step 1019). Otherwise, a "no" branch is taken which throws a "queue not found" exception (step 1017).

Following both the throw exception (step 1017) and the return handle to the queue (step 1019) steps, execution passes to the calling application. The application making the call may be, for example, Java application/applets 206a and 206b in FIG. 2.

TABLE 1

Coding implementations

Java implementation:

String strQueue=String("/queues/app/usr2/q.1");
C++ implementation:

char *pQueue="queues::app::usr2::q.1";

A Java implementation is shown on the second line of Table 1. A C++ implementation is shown on the fourth line of Table 1.

In either case, a boundary-delimiter between each hierarchical level denotes using the forward-slash character and the double-colon characters in the Java and C++ cases respectively. It is appreciated that other characters or character combinations may operate as boundary-delimiters, depending on the conventions of the coding language.

Thus, the different aspects of the present invention may permit a user operating an application to achieve automatic mapping of a queue name when options are set by a user. The mapping may depend from environment variables or terms defined at compile time by preprocessor commands. In addition, one or more ad hoc queue namespace schema maps may permit further hierarchical levels of queue name encapsulation.

In total, the different aspects of the present invention may permit users to operate more effectively with a single queue manager rather than several.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

The invention can take the form of an entirely hardware embodiment, an entirely software embodiment, or an embodiment containing both hardware and software elements. In a preferred embodiment, the invention is implemented in software which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a set of queues, the computer-implemented method comprising:
   receiving a request from a requestor for a queue in the set of queues using a selected name to form a received request;
   associating the selected name in the received request with a queue namespace object in a set of queue namespace objects, further comprising:
      obtaining a queue namespace schema map, further comprising:
         determining whether the selected name is associated with a nested queue namespace object; and
         responsive to the selected name being associated with the nested queue namespace object, obtaining the queue namespace schema map such that the queue is selected from an administrative queue and a dynamic queue;
      opening a queue namespace, wherein opened queue namespace is a hierarchical level lower than a parent queue namespace and an object within the queue namespace is accessible;
      finding a queue, wherein the queue is associated with the queue namespace; and
      returning a handle to the request for the queue; and
   processing requests for accessing the set of queues using the selected name and the queue namespace object in the set of queue namespace objects such that different applications are assigned different queues in the set of queues using the selected name, further comprising;
      receiving a request from the requestor to access a particular queue using a particular name;
      identifying a queue namespace object for the requestor to form an identified queue namespace object; and
      providing access to a particular queue identified in the identified queue namespace object using the particular name.

2. A computer program product stored on a recordable-type computer useable medium for managing a set of queues, comprising:
   computer useable program code for receiving a request from a requestor for a queue in the set of queues using a selected name to form a received request;
   computer useable program code for associating the selected name in the received request with a queue namespace object in a set of queue namespace objects, further comprising:
      computer useable program code for obtaining a queue namespace schema map, further comprising:
         computer useable program code for determining whether the selected name is associated with a nested queue namespace object; and
         computer useable program code for responsive to the selected name being associated with the nested queue namespace object, obtaining the queue namespace schema map such that the queue is selected from an administrative queue and a dynamic queue;
      computer useable program code for opening a queue namespace, wherein opened queue namespace is a hierarchical level lower than a parent queue namespace and an object within the queue namespace is accessible;
      computer useable program code for finding a queue, wherein the queue is associated with the queue namespace; and
      computer useable program code for returning a handle to the request for the queue; and
   computer useable program code for processing requests for accessing the set of queues using the selected name and the queue namespace object in the set of queue namespace objects such that different applications are assigned different queues in the set of queues using the selected name, further comprising;
      computer useable program code for receiving a request from the requestor to access a particular queue using a particular name;
      computer useable program code for identifying a queue namespace object for the requestor to form an identified queue namespace object; and
      computer useable program code for providing access to a particular queue identified in the identified queue namespace object using the particular name.

3. An apparatus for managing a set of queues, comprising:
   a bus system;
   a communications system coupled to the bus system;
   a memory connected to the bus system, wherein the memory includes computer useable program code; and
   a processing unit coupled to the bus system, wherein the processing unit executes the computer useable program code computer program code to receive a request from a requestor for a queue in the set of queues using a selected name to form a received request; to associate the selected name in the received request with a queue namespace object in a set of queue namespace objects, further comprising obtaining a queue namespace schema map, further comprising determining whether the selected name is associated with a nested queue namespace object, and responsive to the selected name being associated with the nested queue namespace object, obtaining the queue namespace schema map such that the queue is selected from an administrative queue and a dynamic queue, opening a queue namespace, wherein opened queue namespace is a hierarchical level lower than a parent queue namespace and an object within the queue namespace is accessible, finding a queue, wherein the queue is associated with the queue namespace, and returning a handle to the request for the queue; and to process requests for accessing the set of queues using the selected name and the queue namespace object in the set of queue namespace objects such that different applications are assigned different queues in the set of queues using the selected name, further comprising receiving a request from the requestor to access a particular queue using a particular name, identifying a queue namespace object for the requestor to form an identified queue namespace object, and providing access to a particular queue identified in the identified queue namespace object using the particular name.

* * * * *